United States Patent
Nishida et al.

(10) Patent No.: US 8,801,130 B2
(45) Date of Patent: Aug. 12, 2014

(54) IMAGE POSITION INSPECTING APPARATUS, COMPUTER-READABLE MEDIUM AND IMAGE FORMING APPARATUS

(75) Inventors: Toru Nishida, Kanagawa (JP); Takeshi Zengo, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 239 days.

(21) Appl. No.: 13/348,890

(22) Filed: Jan. 12, 2012

(65) Prior Publication Data

US 2013/0070011 A1 Mar. 21, 2013

(30) Foreign Application Priority Data

Sep. 20, 2011 (JP) ................................. 2011-205399

(51) Int. Cl.
*B41J 29/38* (2006.01)
(52) U.S. Cl.
USPC .......................................................... 347/12
(58) Field of Classification Search
None
See application file for complete search history.

(56) References Cited

U.S. PATENT DOCUMENTS

| 7,201,462 B2* | 4/2007 | Shibata et al. .................. 347/19 |
| 2004/0104951 A1 | 6/2004 | Shibata et al. | |
| 2005/0046658 A1* | 3/2005 | Kojima ........................... 347/19 |
| 2005/0179710 A1* | 8/2005 | Tatsuta et al. ..................... 347/5 |
| 2006/0244774 A1* | 11/2006 | Arazaki et al. .................. 347/19 |
| 2007/0040878 A1* | 2/2007 | Ikefuji et al. ..................... 347/90 |
| 2010/0079518 A1 | 4/2010 | Yamazaki | |
| 2010/0201733 A1* | 8/2010 | Yoshida et al. ................. 347/16 |

FOREIGN PATENT DOCUMENTS

| JP | 2004-058282 | 2/2004 |
| JP | 2007-054970 | 3/2007 |
| JP | 2010-087757 | 4/2010 |

* cited by examiner

*Primary Examiner* — Geoffrey Mruk
*Assistant Examiner* — Bradley Thies
(74) *Attorney, Agent, or Firm* — Fildes & Outland, P.C.

(57) ABSTRACT

An image position inspecting apparatus includes a reading unit, a generating unit and a specifying unit. The reading unit includes light receiving elements arranged with a reading resolution Rs and reads an inspection image. The generating unit generates a profile based on the read inspection image. The specifying unit acquires a position of the center of gravity of the pixels of the inspection image with respect to the light receiving elements from the profile and specifies a position of each of the pixels of the inspection image based on a phase difference which is a deviation of the acquired position of the center of gravity of the pixels with respect to a light receiving center of the light receiving elements. A resolution of the inspection image is Rp. The reading resolution Rs and the resolution Rp satisfy the following equation. And, m is a positive integer. $Rp \cdot ((m+1)/2) < Rs < Rp \cdot ((m+2)/2)$.

7 Claims, 13 Drawing Sheets

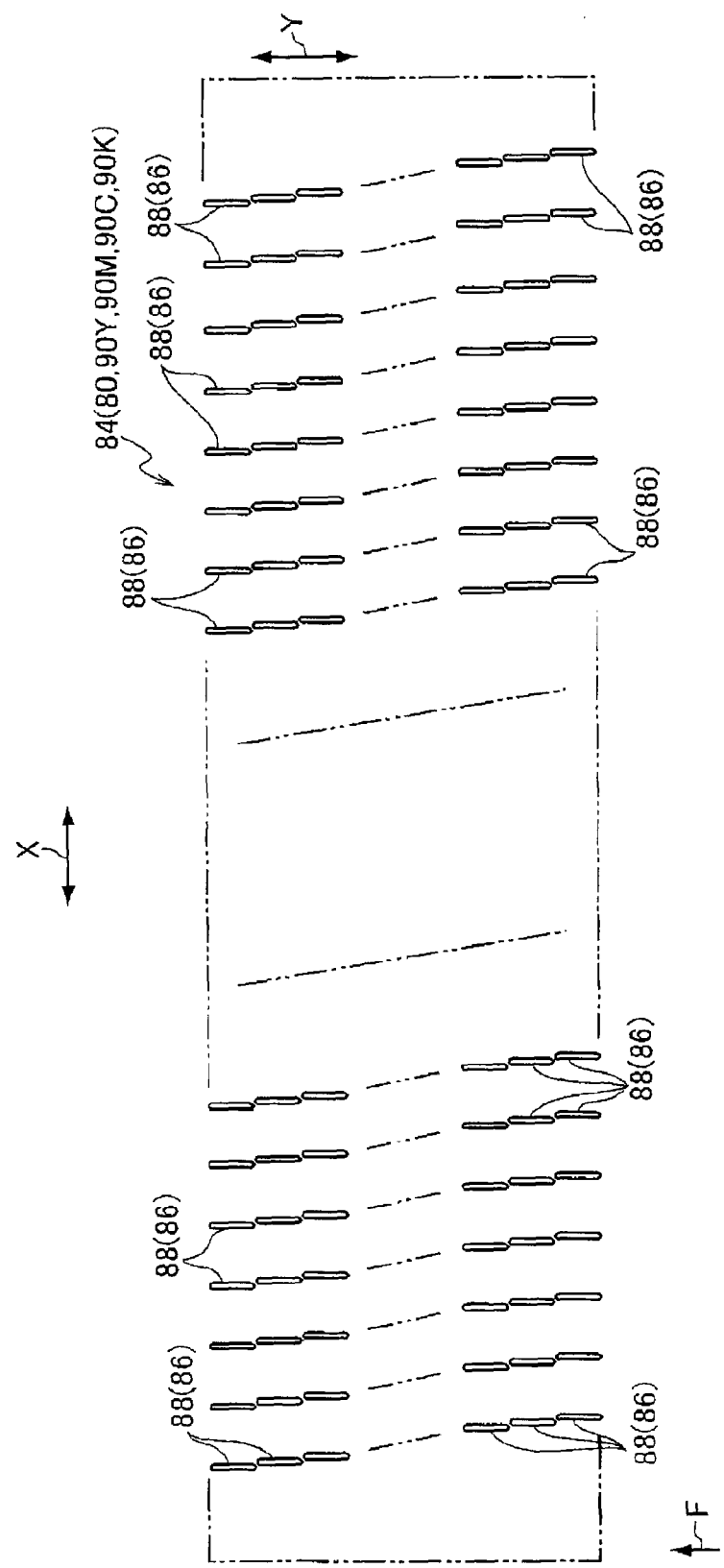

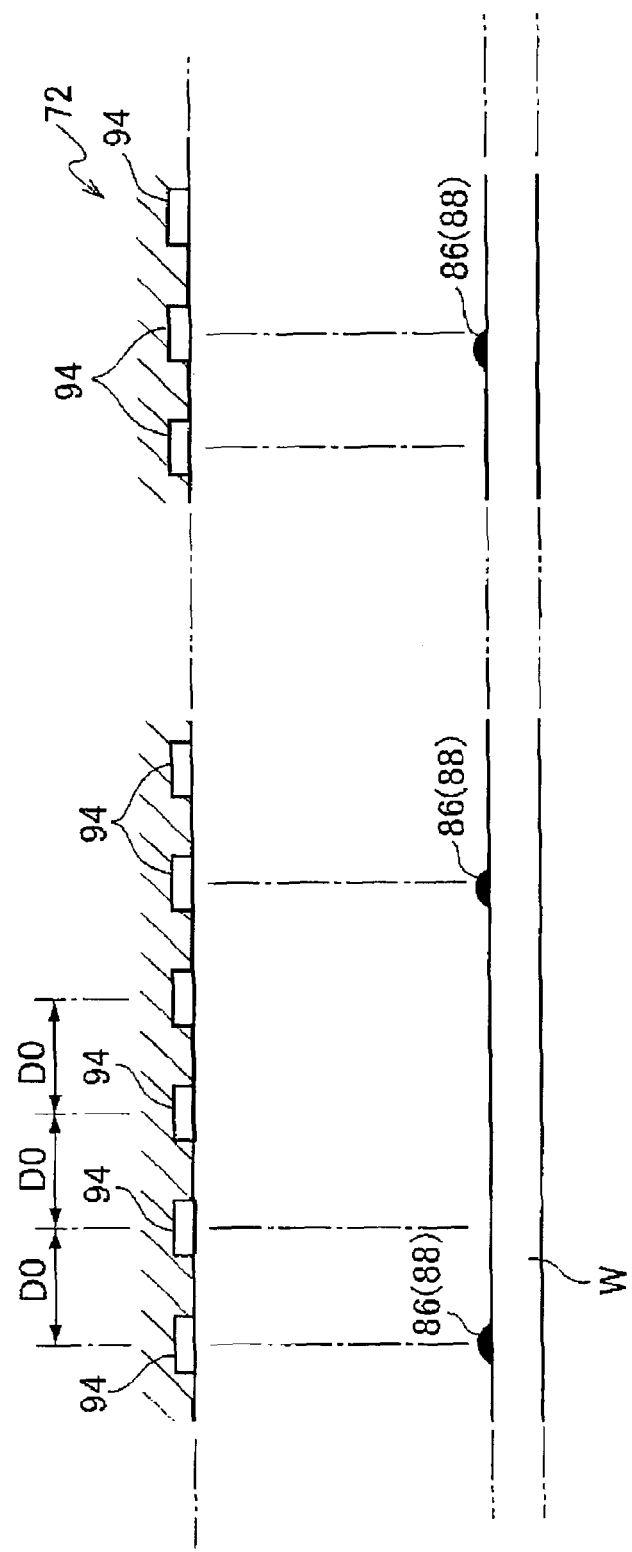

IMAGE POSITION INSPECTING APPARATUS, COMPUTER-READABLE MEDIUM AND IMAGE FORMING APPARATUS

CROSS-REFERENCE TO RELATED APPLICATION

This application is based on and claims priority under 35 USC 119 from Japanese Patent Application No. 2011-205399 filed Sep. 20, 2011.

BACKGROUND

1. Technical Field

The present invention relates to an image position inspecting apparatus, a computer-readable medium and an image forming apparatus.

SUMMARY (1) According to an aspect of the invention, an image position inspecting apparatus includes a reading unit, a generating unit and a specifying unit. The reading unit includes light receiving elements arranged in a main scanning direction crossing a conveying direction of a recording media and reads an inspection image formed on the recording media one pixel by one pixel at intervals of the same number of pixels along the main scanning direction. The generating unit generates a profile along a main scanning direction of the inspection image based on the inspection image read by the image reading unit. The specifying unit acquires a position of the center of gravity of the pixels of the inspection image with respect to the light receiving elements from the profile and specifies a position of each of the pixels of the inspection image in the main scanning direction based on a phase difference. The phase difference is a deviation of the acquired position of the center of gravity of the pixels in the inspection image with respect to a light receiving center of the light receiving elements. When a reading resolution of the image reading unit along the main scanning direction is Rs and a resolution of the inspection image along the main scanning direction is Rp, the reading resolution of the image reading unit and the resolution of the inspection image satisfy the following equation: $Rp \cdot ((m+1)/2) < Rs < Rp \cdot ((m+2)/2)$, and m is a positive integer.

BRIEF DESCRIPTION OF THE DRAWINGS

Exemplary embodiments of the invention will be described in detail based on the following figures, wherein:

FIG. 5 is a schematic view of a pattern image as an inspection image;

FIG. 6 is a schematic view illustrating relative positions of a CCD and a line;

DETAILED DESCRIPTION

Figure 1:
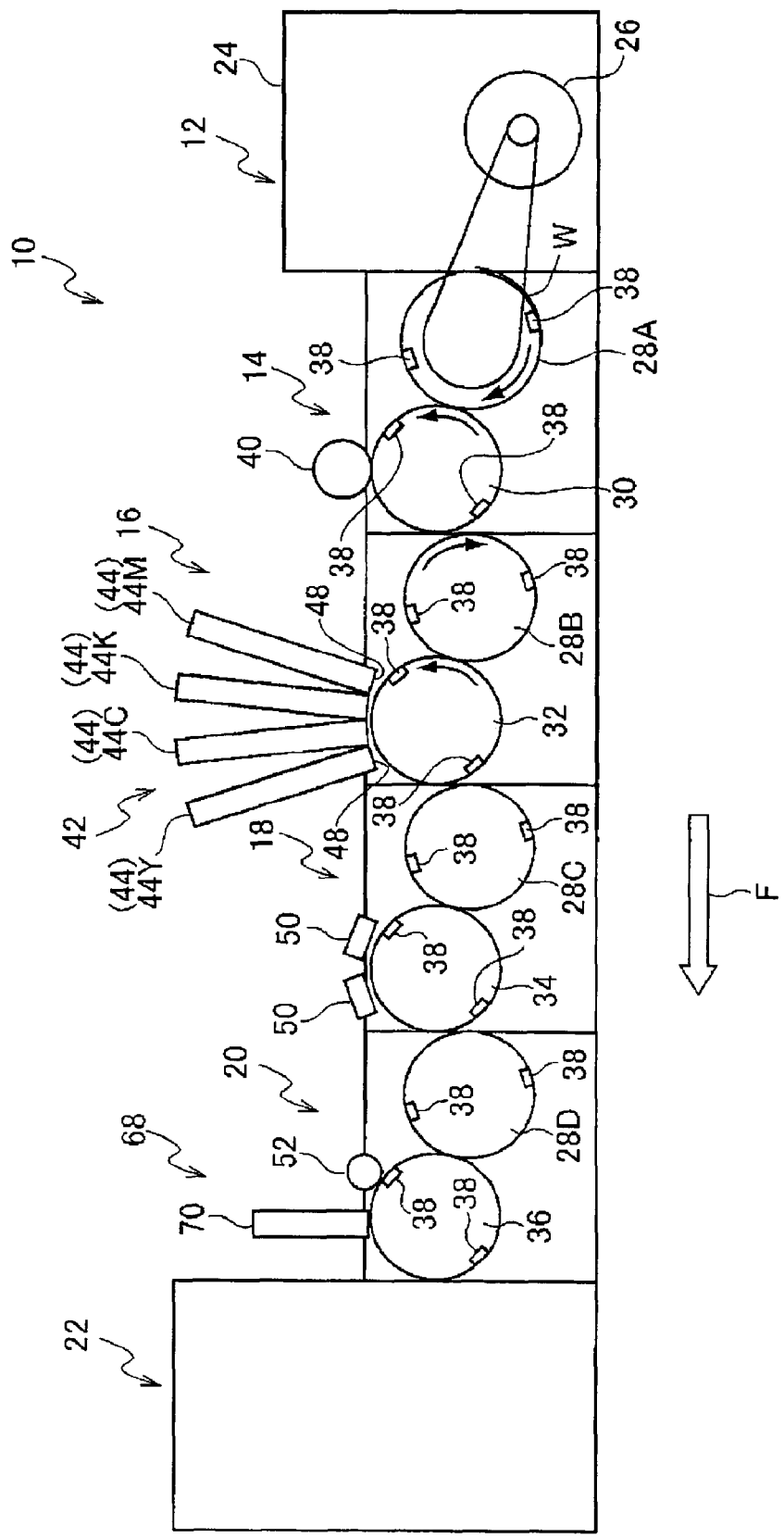
FIG. 1 is a schematic configuration diagram of an image forming apparatus according to an exemplary embodiment.

Hereinafter, exemplary embodiments of the present invention will be described with reference to the accompanying drawings. FIG. 1 illustrates a schematic configuration of an image forming apparatus 10 according to an exemplary embodiment. The image forming apparatus 10 forms (records or prints) an image on a recording media in an inkjet method. Although the image forming apparatus 10 corresponds to an image recording apparatus according to the present invention, the present invention can be applied to an image recording apparatus configured to eject droplets, and a droplet ejecting apparatus.

The image forming apparatus 10 is provided with a paper feeding/conveying unit 12 that feeds and conveys a recording paper W which is a recording media. In the image forming apparatus 10, a processing liquid coating unit 14 that coats a processing liquid on a recording surface (surface) of the recording paper W, an image forming unit 16 that forms an image on the recording surface of the recording paper W, an ink drying unit 18 that dries the image formed on the recording surface, an image fixing unit 20 that fixes the dried image on the recording paper W, and a discharging unit 22 that discharges the recording paper W on which the image is fixed (the recording paper W on which the image is formed) are installed in order along a conveying direction (a direction of an arrow F illustrated in FIG. 1) of a recording paper W by the paper feeding/conveying unit 12.

The paper feeding/conveying unit 12 includes an accommodating unit 24 that accommodates the recording paper W. In the accommodating unit 24, a motor 26 that serves as a driving module and a paper feeder (not shown) are installed. The recording paper W accommodated in the accommodating unit 24 is taken-out by the paper feeder and is transferred to the processing liquid coating unit 14 by the driving force of the motor 26.

The processing liquid coating unit 14 includes a paper transfer cylinder 28A and a processing liquid coating cylinder 30, and the image forming unit 16 includes a paper transfer cylinder 28B and a printing cylinder 32. The ink drying unit 18 includes a paper transfer cylinder 28C and a drying cylinder 34, and the ink fixing unit 20 includes a paper transfer cylinder 28D and a fixing cylinder 36. The respective cylinders are driven to rotate in a direction of an arrow of FIG. 1 at a predetermined circumferential speed, for example, by the transmission of the driving force of the motor 26 installed in the paper feeding/conveying unit 12.

In the image forming apparatus 10, the cylinders from the paper transfer cylinder 28A to the fixing cylinder 36 are sequentially arranged along a conveying direction of the recording paper W. In the respective cylinders, holding members 38 are installed on outer periphery portions thereof. The recording paper W, of which an end of an upstream-side of a conveying direction is held to the holding member 38, is wound around the outer periphery surfaces of the respective cylinders. Thereafter, the recording paper W is conveyed by the sequential transfer from the upstream-side cylinder to the downstream-side cylinder.

The processing liquid coating unit 14 holds and receives the recording paper W, which is transferred from the accommodation unit 24, on the periphery surface of the paper transfer cylinder 28A by the holding member 38, and transfers the recording paper W to the processing liquid coating cylinder 30. In the processing liquid coating cylinder 30, the recording paper W is held by the holding member 38 and is wound around the outer periphery surface.

The processing liquid coating unit 14 includes a processing liquid coating roll 40 disposed such that the outer periphery surface thereof comes in contact with the outer periphery surface of the processing liquid coating cylinder 30. In the processing liquid coating unit 14, a processing liquid is coated by the processing liquid coating roll 40 on the surface (recording surface) of the recording paper W held on the outer periphery surface of the processing liquid coating cylinder 30, and then the recording paper W is transferred to the image forming unit 16. The processing liquid to be coated on the surface of the recording paper W reacts with an ink to condense a color material (pigment), and accelerates the separation of the color material and a solvent.

The image forming unit 16 receives the recording paper W transferred from the processing liquid coating unit 14 by the paper transfer cylinder 28B, and then transfers the recording paper W to the printing cylinder 32. In the printing cylinder 32, the recording paper W is held by the holding member 38 and is wound around the outer periphery surface of the printing cylinder 32.

In the image forming unit 16, a head unit 42 is installed above the printing cylinder 32. The head unit 42 includes four inkjet recording heads (recording heads 44). The recording heads 44 include a recording head 44Y, a recording head 44M, a recording head 44C, and a recording head 44K (hereinafter, referred to as recording heads 44) which eject ink droplets of different colors (any one of color of yellow (Y), magenta (M), cyan (C), and black (B)) as liquid droplets.

Figure 2:
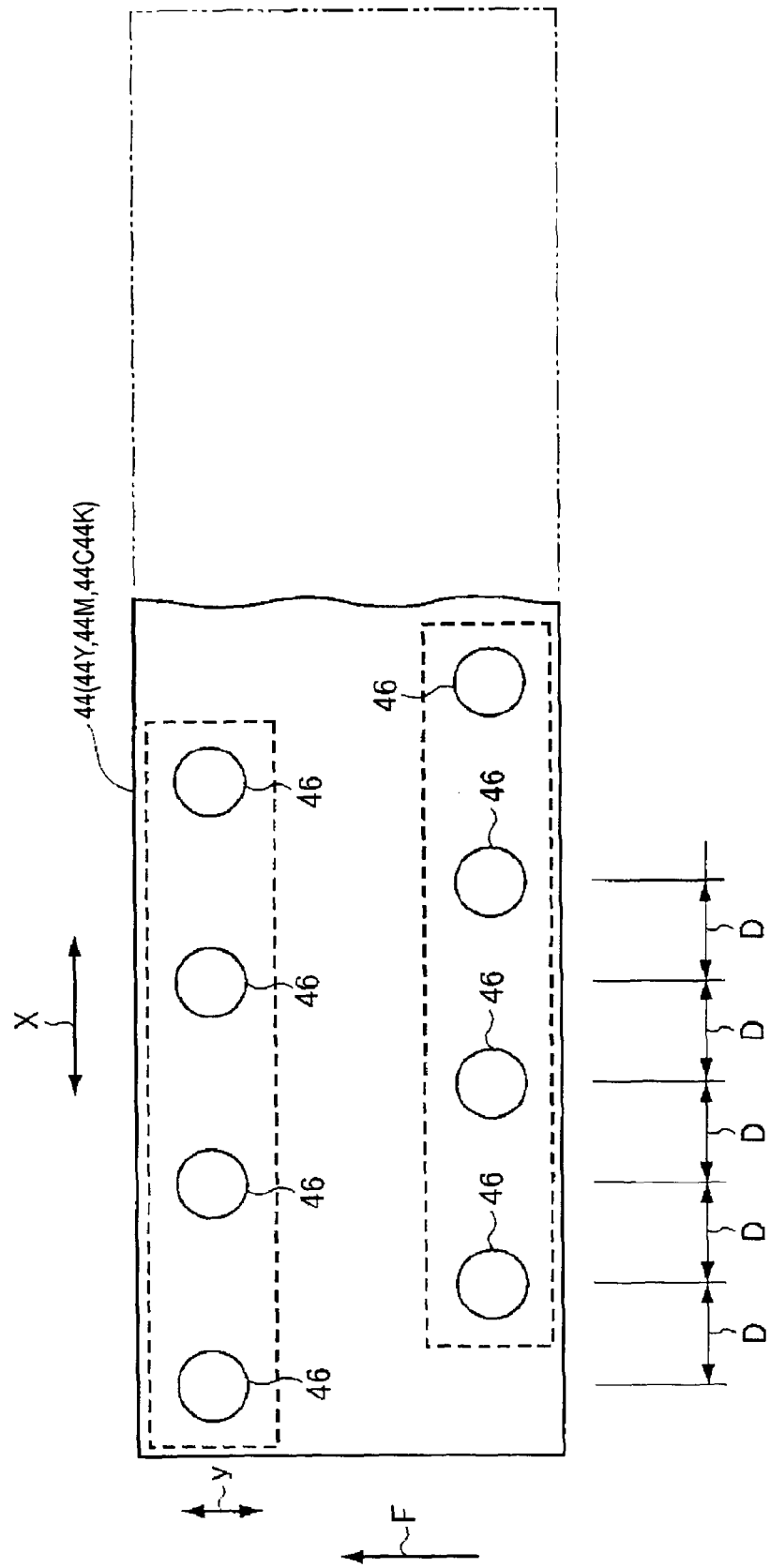
FIG. 2 is a schematic view illustrating an example of a recording head.

As illustrated in FIG. 2, in the recording heads 44, a plurality of nozzles 46 ejecting liquid droplets are arranged in a two-dimensional shape. In the recording heads 44, center positions of the respective nozzles 46 are arranged at intervals D when projecting on a straight line along a main scanning direction (a direction of an arrow X of FIG. 2).

As illustrated in FIG. 1, the recording heads 44 are arranged in order along the circumferential direction of the printing cylinder 32. In the recording heads 44, the ejection surfaces 48 on which the nozzles 46 are installed are directed toward the printing cylinder 32, and are disposed near the outer periphery surface of the printing cylinder 32. The recording heads 44 is attached such that the main scanning direction (a direction of an arrow X of FIG. 2) is a direction crossing a conveying direction of the recording paper W (an axial direction of the printing cylinder 32, a direction perpendicular to the paper surface of FIG. 1).

In the image forming unit 16, a rotational direction of the printing cylinder 32 is a sub scanning direction, and the image forming unit 16 ejects ink droplets from the respective recording heads 44 toward the recording surface of the recording paper W held on the printing cylinder 32. In this way, on the recording paper W, ink droplets are attached on the processing liquid layer formed by the processing liquid coated by the processing liquid coating unit 14, and thus, an image (color image) is formed. The recording paper W on which the image is formed is transferred from the printing cylinder 32 to the ink drying unit 18.

Ink drying unit 18 receives the recording paper W transferred from the image forming unit 16 by the paper transfer cylinder 28C, then the ink drying unit 18 transfers the recording paper W to the drying cylinder 34. In the drying cylinder 34, the recording paper W is held by the holding member 38 and is wound around the outer periphery surface of the drying cylinder 34.

The ink drying unit 18 includes a hot air heater 50 that is attached to face the outer periphery surface of the drying cylinder 34. The ink drying unit 18 blows out hot air from the hot air heater 50 toward the recording paper W that is held on the outer periphery surface of the drying cylinder 34. Therefore, the remaining solvent is removed from the image (ink droplet) formed on the surface of the recording paper W, and the image is dried. The recording paper W in which the image is dried is transferred from the drying cylinder 34 to the image fixing unit 20.

The image fixing unit 20 receives the recording paper W transferred from the ink drying unit 20 by the paper transfer cylinder 28D, the image fixing unit 20 transfers the recording paper W to the fixing cylinder 36. In the fixing cylinder 36, the recording paper W is held by the holding member 38 and is wound around the outer periphery surface of the fixing cylinder 36.

The image fixing unit 20 includes a fixing roll 52 with a built-in heater, which is press-contacted and attached on the outer periphery surface of the fixing cylinder 36. In the image fixing unit 20, the recording paper W held on the outer periphery surface of the fixing cylinder 36 is pressurized and heated by the fixing roll 52 that is heated by the heater. Therefore, a color material forming an image is fused on the recording paper W, and the image is fixed thereon. The image fixing unit 20 transfers the recording paper W, on which the image is fixed, from the fixing cylinder 36 to a discharging unit 22.

Figure 3:
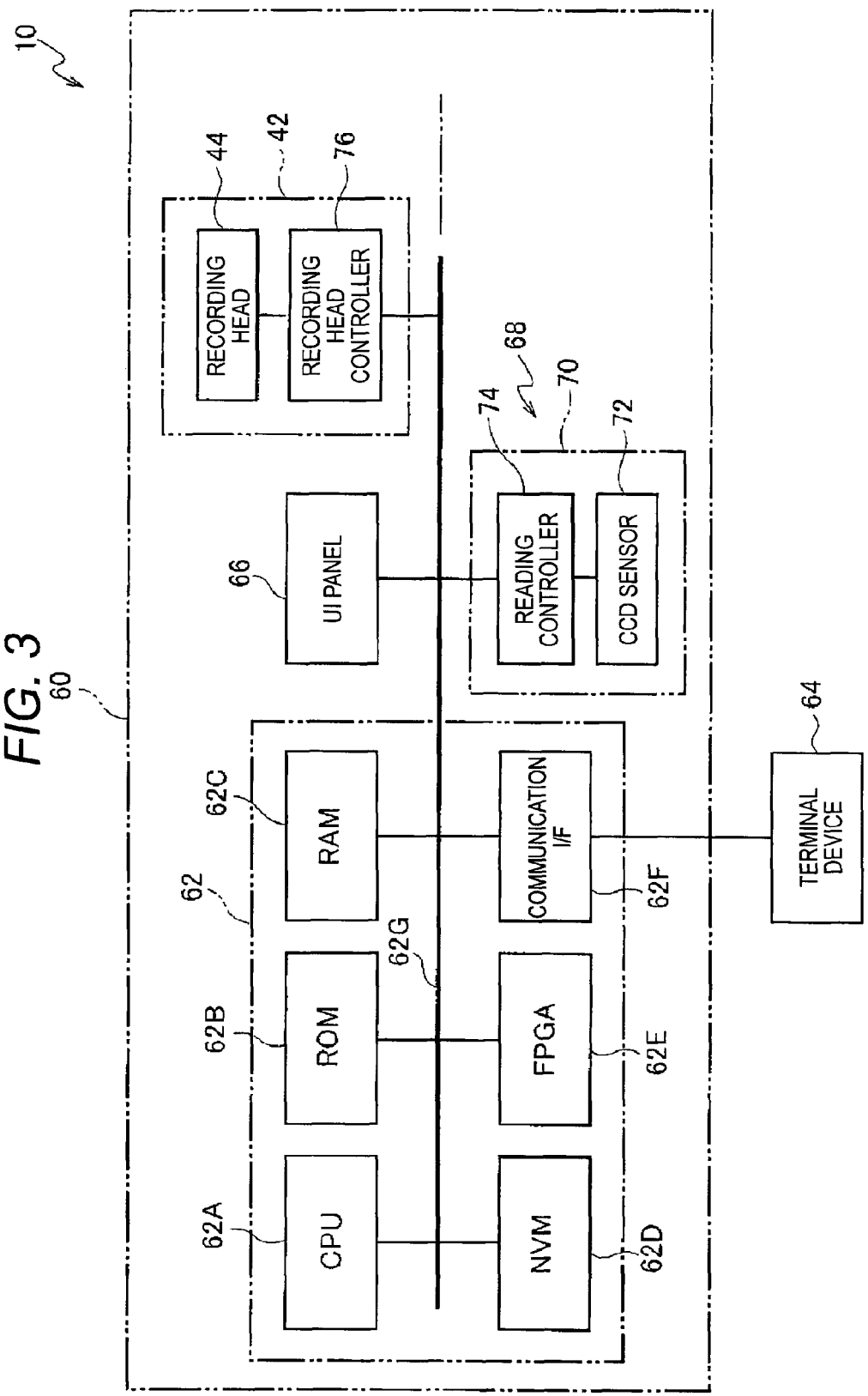
FIG. 3 is a configuration diagram of a control unit.

Meanwhile, as illustrated in FIG. 3, the image forming apparatus 10 includes a control unit 60 configured to control an operation of the apparatus. The control unit 60 includes an embedded microcomputer (hereinafter, referred to as a computer) 62. The computer 62 has a typical configuration in which, for example, a CPU 62A, a ROM 62B, a RAM 62C, an NVM (Non Volatile Memory) 62D, an FPGA (Field Programmable Gate Array) 62E, and a communication I/F (Interface) unit 62F are included, and they are mutually connected through a system bus 64G.

The CPU 62A and the FPGA 62E perform a control process that controls operations of the respective units of the image forming unit 10 by reading out a control program from the ROM 62B and executing the control program. The ROM 62B stores a variety of programs, including the above-described control program and programs to be executed by the CPU 62A and the FPGA 62E. The RAM 62C is used, for example, as a work area when the CPU 62A and the FPGA 62E execute the variety of programs. The NVM 62D stores a variety of data that should be retained even in a period when power of the image forming apparatus 10 is shut down. The communication I/F unit 62F is connected to a terminal device 64 such as a personal computer and receives a variety of information, such as image information indicating an image to be formed on the recording paper W, from the terminal device 64.

The computer 62 is connected to a UI (User Interface) panel 66. The UI panel 66 includes a display unit configured to display a variety of information, and an input unit used by a user to input a variety of information or instructions. The control unit 60 displays a variety of information about the image forming apparatus 10 on the UI panel 66, and receives information and instructions about the image forming apparatus 10 from the UI panel 66.

The image forming apparatus 10 includes a nozzle inspecting apparatus 68 as an image position inspecting apparatus. The nozzle inspecting apparatus 68 inspects an ejecting direction of ink droplets with respect to the nozzles 46 installed in the recording heads 44 by inspecting an image that is formed on the recording paper W by droplets ejected from the recording heads 44. As illustrated in FIG. 1, the nozzle inspecting apparatus 68 includes an image reading unit 70 as an image reading module. The image reading unit 70 is disposed to face the outer periphery surface of the fixing cylinder 36 of the image fixing unit 20, and is used to read out the image formed on the recording paper W held on the outer periphery surface of the fixing cylinder 36.

As illustrated in FIG. 3, the image reading unit 70 includes a CCD sensor 72 using a CCD (Charge Coupled Device) as an example of a light receiving element, and a reading controller 74 that controls the reading by using the image using the CCD sensor 72. The reading controller 74 of the image reading unit 70 is connected to the system bus 62G and the operation thereof is controlled by the computer 62.

In the head unit 42 of the image forming unit 16, a recording head controller 76 configured to control the operations of the recording heads 44 (44Y, 44M, 44C, 44K) is installed. The recording head controller 76 is connected to the system bus 62G. The recording head controller 76 drives a driving module such as piezoelectric elements (not shown) installed at the respective nozzles 46 of the recording heads 44, based on print data transmitted from the computer 62, and ejects ink droplets from the nozzles 46, based on the print data.

In the computer 62, a nozzle inspecting program is stored in the ROM 62B. Therefore, in the computer 62, the CPU 62A reads out the nozzle inspecting program from the ROM 62B and executes the nozzle inspecting program to perform a nozzle inspecting process. The nozzle inspecting program may be executed by the FPGA 62E, without being limited to the CPU 62A.

The computer 62 performs an image forming process to form an image on the recording media W, based on image information input from the terminal device 64. At this time, the computer 62 performs a correcting process with respect to the image information when the image is formed on the recording paper W, based on the inspection result of the nozzle inspecting apparatus 68, and outputs print data generated by the correcting process to the recording head controller 76. Therefore, the image forming apparatus 10 forms an image based on the corrected print data on the recording paper W according to the inspection result of the nozzle inspecting apparatus 68.

Hereinafter, as the operation of the present embodiment, the nozzle inspecting process by the nozzle inspecting apparatus 68 included in the image forming apparatus 10 will be described.

Figure 4A:
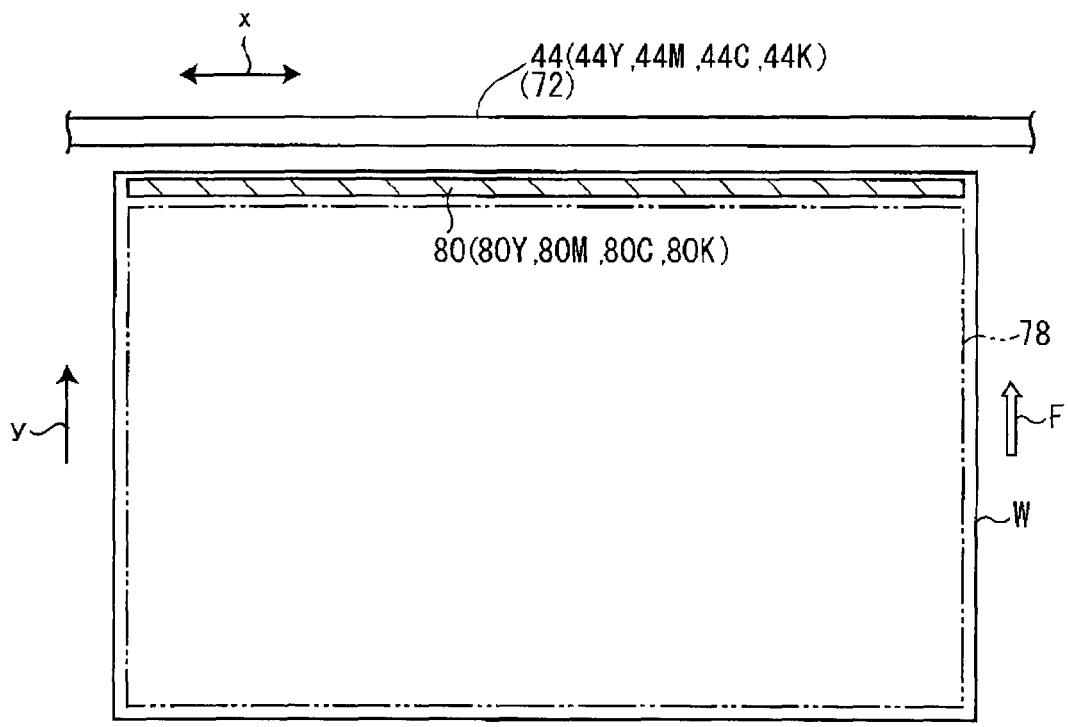
FIG. 4A is a schematic view of a recording paper including an inspection pattern image used for an inspection during processing.

As illustrated in FIG. 4A, in the image forming apparatus 10, an area (an area of a central portion) except for a circumferential edge portion of the recording paper W is set as an image area 78 that forms an image based on the image information. The length of the recording head 44 in a longitudinal direction is a length covering an entire area of a direction crossing the conveying direction of the recording paper W. Therefore, the image forming apparatus 10 forms an image by setting the longitudinal direction of the recording head 44 as the main scanning direction (the direction of the arrow X) and setting the conveying direction of the recording paper W (the rotating direction of the printing cylinder 32) as the sub scanning direction (the direction of the arrow Y).

The CCD sensor 72 that is installed in the nozzle inspecting apparatus 68 is disposed along the direction (the conveying width direction of the recording paper W) that crosses the conveying direction of the recording paper W, and has the length along the conveying width direction of the recording paper W which is longer than recording paper W (see FIG. 2). Therefore, the CCD sensor 72 reads out the image while setting the conveying direction of the recording paper W (the rotating direction of the fixing cylinder 36) as the sub scanning direction. The CCD sensor 72 may be, for example, CCD sensors that are divided in numbers along the main scanning direction. In this case, reading areas may be overlapped between the adjacent CCD sensors.

The image forming apparatus 10 ejects the respective color ink droplets from the recording head 44Y (yellow), the recording head 44M (magenta), the recording head 44C (cyan), and the recording head 44K (black) to form a color image on the recording media W. The CCD sensor 72 reads out the respective color concentrations of R (red), G (green), and B (blue) from the recording paper W. The nozzles 46 are installed in the respective recording heads 44Y, 44M, 44C and 44K. However, in the nozzle inspecting process of the nozzle inspecting apparatus 68, there is no difference in a basic process between different colors. Thus, hereinafter, the recording heads 44Y, 44M, 44C and 44K will be described as the recording heads 44, without specifying colors (colors of ink droplets).

In the computer 62 installed in the image forming apparatus 10, an image of a pattern (inspection pattern) preset as an inspection image for nozzle inspection is stored in the ROM 62B or the NVM 62D. The computer 62 forms an inspection pattern on the recording paper W at a preset timing. In the image forming apparatus 10 (computer 62), for example, an inspection before the image forming process (hereinafter, referred to as a prior-to-processing inspection) that performs a nozzle inspection prior to the image forming process based on the image information input from the terminal device 64 or the like, and an inspection during the image process (hereinafter, referred to as an in-processing inspection) that performs a nozzle inspection using the recording paper W on which the image is formed based on the image information are set. Although the nozzle inspection is performed prior to the image forming process based on the image information, the nozzle inspection may be performed after completing the image forming process based on a preceding image information and before starting the image forming process based on a following image information.

Figure 4B:
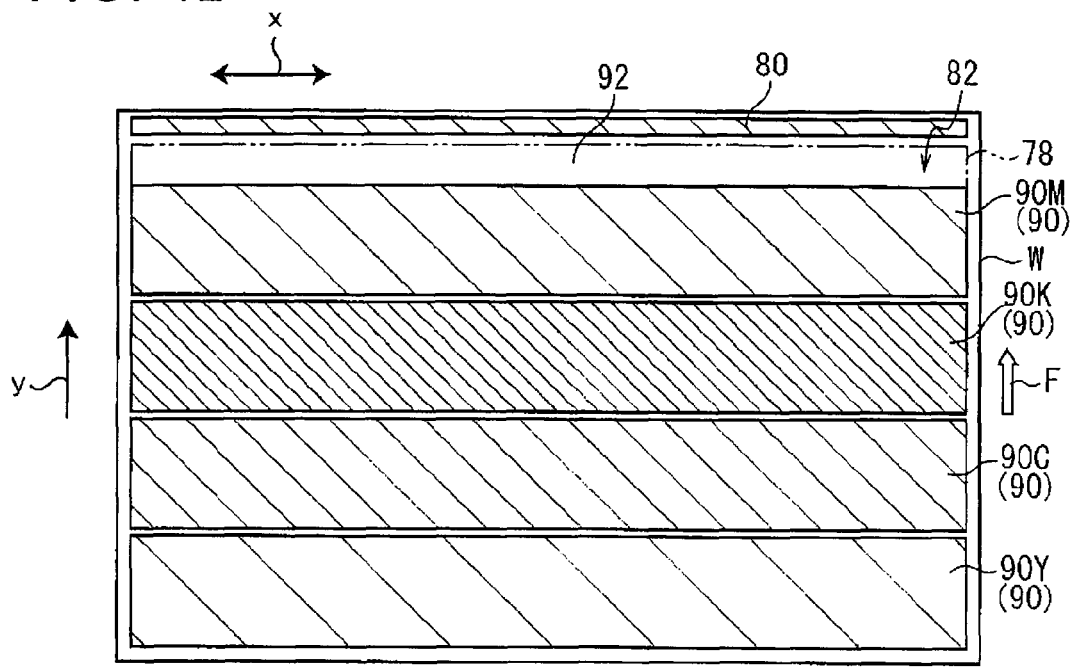
FIG. 4B is a schematic view of a recording paper including an inspection pattern image used for an inspection before processing.

FIG. 4A illustrates an inspection pattern image 80 that is used in the in-processing inspection. The computer 62 forms the inspection pattern image 80 at an end portion of the upstream side (gripper edge side) of the conveying direction of the recording paper W that is set as a non-image area (a circumferential edge side outside the image area 78 in the recording paper W). FIG. 4B illustrates an inspection pattern image 82 that is used in the prior-to-processing inspection. The inspection pattern image 82 is formed in the image area 78 of the recording paper W.

FIG. 5 illustrates a pattern image 84 that is a basic configuration of the inspection pattern images 80 and 82. The pattern image 84 is an inspection image, and a dot 86 being a pixel in the embodiment is formed using the nozzles 46 selected by opening N nozzles 46 along the main scanning direction. That is, in the case of N=9, the dot 86 is formed by ejecting droplets from the first and eleventh nozzles 46 along the main scanning direction, and ejection of ink droplets from nine (N) nozzles 46 from the second to tenth nozzles is stopped. This ejection pattern is repeated along the main scanning direction. In the resulting pattern image 84, a "1 on N off" dot pattern is formed with respect to 1 main scanning line.

With respect to a resolution (print resolution) (RP) (dpi) of the main scanning direction of the recording head 44 when ink droplets are ejected from all nozzles 46 of the recording head 44), an inspection resolution (Rp) of the pattern image 84 is Rp=RP/(1+N) (dpi) in a case where a line pitch of the dot 86 of the pattern image 84 is a resolution (Rp) (dpi) of the inspection image (hereinafter, referred to as an inspection resolution) along the main scanning direction. Therefore, in the case of N=9, the inspection resolution (Rp) becomes 1/10 of the print resolution (RP). In a case where the print resolution (RP) is 1,200 (dpi), the inspection resolution (line pitch) (Rp) of the pattern image 84 becomes 120 (dpi).

In the pattern image 84, a plurality of dots 86 (for example, 51 dots) are successive with respect to one nozzle 46 along the sub scanning direction (the direction of the arrow Y). In the pattern image 84, a line 88 is formed by the successive dots 86. In this manner, the line 88 according to the number of nozzles ejecting ink droplets is formed in a 1-stage ladder shape along the main scanning direction. Hereinafter, the line 88 formed as one "1 on N off" pattern along the main scanning direction will be referred to as a "stage".

In the pattern image 84, the nozzle 46 that ejects an ink droplet in next time is deviated toward the main scanning direction, and a pattern that ejects droplets from the second and twelfth nozzles 46 and stops the third to eleventh nozzles 46 is repeated along the main scanning direction. By repeating this pattern in the sub scanning direction, a next 1-stage line 88 is formed in a ladder shape.

In the pattern image 84, the line 88 of the "1 on N off" pattern is repeated N+1 times along the sub scanning direction, and the lines 88 having the (N+1)-stage ladder shape are formed. Therefore, the lines 88 are formed by the ink droplets ejected from all nozzles 46 of the recording head 44.

The computer 62 forms the inspection pattern image 80 in the non-image area of the recording paper W when the image according to the image information is formed on the recording paper W. At this time, the computer 62 sequentially forms a Y-color inspection pattern image 80Y, an M-color inspection pattern image 80M, a C-color inspection pattern image 80C, and a K-color pattern image 80K on the recording papers W by changing color of ink droplets used in the inspection pattern image 80 at each recording paper W. The number of the dots 86 in the sub scanning direction, which is the length of each line 88 in the inspection pattern image 80, is previously set (for example, 51 dots) such that the inspection pattern image 80 is received in the non-image area of the recording paper W, considering the width of the non-image area (the width along the sub scanning direction) on the recording paper W.

Meanwhile, in the inspection pattern image 82 illustrated in FIG. 4B, the line 88 is lengthened (for example, 144 dots) by increasing the number of the dots 86 successive along the sub scanning direction with respect to colors of Y, M, C and K and stages of the pattern image 84. In the inspection pattern image 82, the non-image area 92 in which the non-printed surface of the recording paper W exists intactly within the image area 78 is formed. Therefore, the computer 62 forms the non-image area 92 within the image area 78 of the recording paper W, and sequentially forms the inspection pattern images 90Y, 90M, 90C and 90K by lengthening the respective lines 88 (see FIG. 5) along the sub scanning direction, as the inspection pattern image 82 used in the prior-to-processing inspection.

Meanwhile, in the nozzle inspecting apparatus 68, a preset relationship is established between the reading resolution (Rs) along the main scanning direction of the CCD sensor 72 and the inspection resolution (Rp) of the inspection pattern images 80 and 90 (pattern image 84).

As illustrated in FIG. 2, in the recording heads 44, the interval of the adjacent nozzles 46 in the main scanning direction (the projection interval of the center positions) is the interval D according to the highest print resolution (RP) along the main scanning direction. Therefore, in the pattern image 84, the lines 88 are formed with the interval according to the interval D by the nozzles 46, at which the ejecting direction of the ink droplets can be considered to be suitable, (positive integer multiple of the interval D).

As illustrated in FIG. 6, in the CCD sensor 72, CCDs 94 are arranged along the main scanning direction (left and right direction of the plane of paper in FIG. 6), the centers of the adjacent CCDs 94 along the main scanning direction (optical axes, illustrated as dashed-dotted lines in FIG. 6) have an interval DO according to the reading resolution Rs of the main scanning direction.

The dots 86 forming the lines 88 corresponding to the CCDs 94 correspond to the pixels of the present embodiment. Deviation of relative positions along to the main scanning direction of the lines 88 with respect to the centers of the CCDs 94 of the CCD sensor 72, that is, deviation of positions of the main scanning direction of the lines 88 with respect to the centers of the CCDs 94, is the phase difference of the lines 88 with respect to the centers (optical axes) of the CCDs 94.

In the nozzle inspecting apparatus 68, the reading resolution Rs and the inspection resolution Rp are set such that the phase difference is changed at each line 88 along the main scanning direction. As the positions of the lines 88, various aspects may be provided which can specify the positions along the main scanning direction of the lines 88, such as the center of gravity of concentration values (brightness values), the center of the outer shape, and the like of the corresponding dots 86.

In this case, the reading resolution Rs and the inspection resolution Rp need to be set such that the positive integer multiple of ½ of one resolution is not consistent with the other resolution. That is, if one resolution is the positive integer multiple of the other resolution, the line 88 at which no phase difference occurs is shown at a period of one resolution with respect to the CCDs 94 of the CCD sensor 72. Even though one resolution is deviated by ½ of one resolution with respect to the positive integer multiple of the other resolution (1.5 times, 2.5 times, etc.), the line 88 at which no deviation in the relative position occurs with respect to the CCD 94 is shown at a period. For example, if one period is 3.5 multiple of the other period, the line 88 having no deviation in the relative position is shown at a period of one period×3.5 with respect to the CCD 94.

In a case where the inspection resolution Rp is decreased and the reading resolution Rs is higher than the inspection resolution Rp by operating the nozzles 46 in the "1 on N off" pattern (ejection of ink droplets), $$Rp \cdot ((m+1)/2) < Rs < Rp \cdot ((m+2)/2)$$

(m is a positive integer).

If the reading resolution Rs has a value close to Rp×((m+1)/2) or Rp×((m+2)/2), the phase difference of the dots 86 with respect to the centers of the CCDs 94 may be slowly changed along the main scanning direction. A period at which the line 88 having no deviation in the relative position with respect to the CCDs 94 is shown may be lengthened.

In other words, the reading resolution Rs may be (Rp·(m+1)/2)+α<Rs<(Rp·(m+2)/2) or (Rp·(m+2)/2)−α<Rs<Rp·(m+2)/2. In this case, m is a positive integer and the deviation amount (α) is 0<α<Rp/2. The smaller deviation (α) may be better.

In the nozzle inspecting apparatus 68, for example, the inspection resolution Rp is set to 120 dpi, and the reading resolution Rs is 477 dpi, which is approximated to four times the inspection resolution Rp, and may be considered to be inconsistent with the inspection resolution Rp even though a tolerance is −0.3% to +3%.

Regarding the reading resolution Rs and the inspection resolution Rp satisfying the above configuration, the CCD sensor 72 of the reading resolution Rs satisfying the above configuration may be used by selecting from the print resolution RP of the recording head 44 or the inspection resolution Rp of the inspection pattern image 84. An aspect in which the inspection resolution Rp of the inspection pattern image 84 is set based on the reading resolution Rs of the CCD sensor 72 may be applied. In the CCD sensor 94 applied to the image forming apparatus 10, for example, the reading resolution of the sub scanning direction is set to 100 dpi.

Figure 7A:
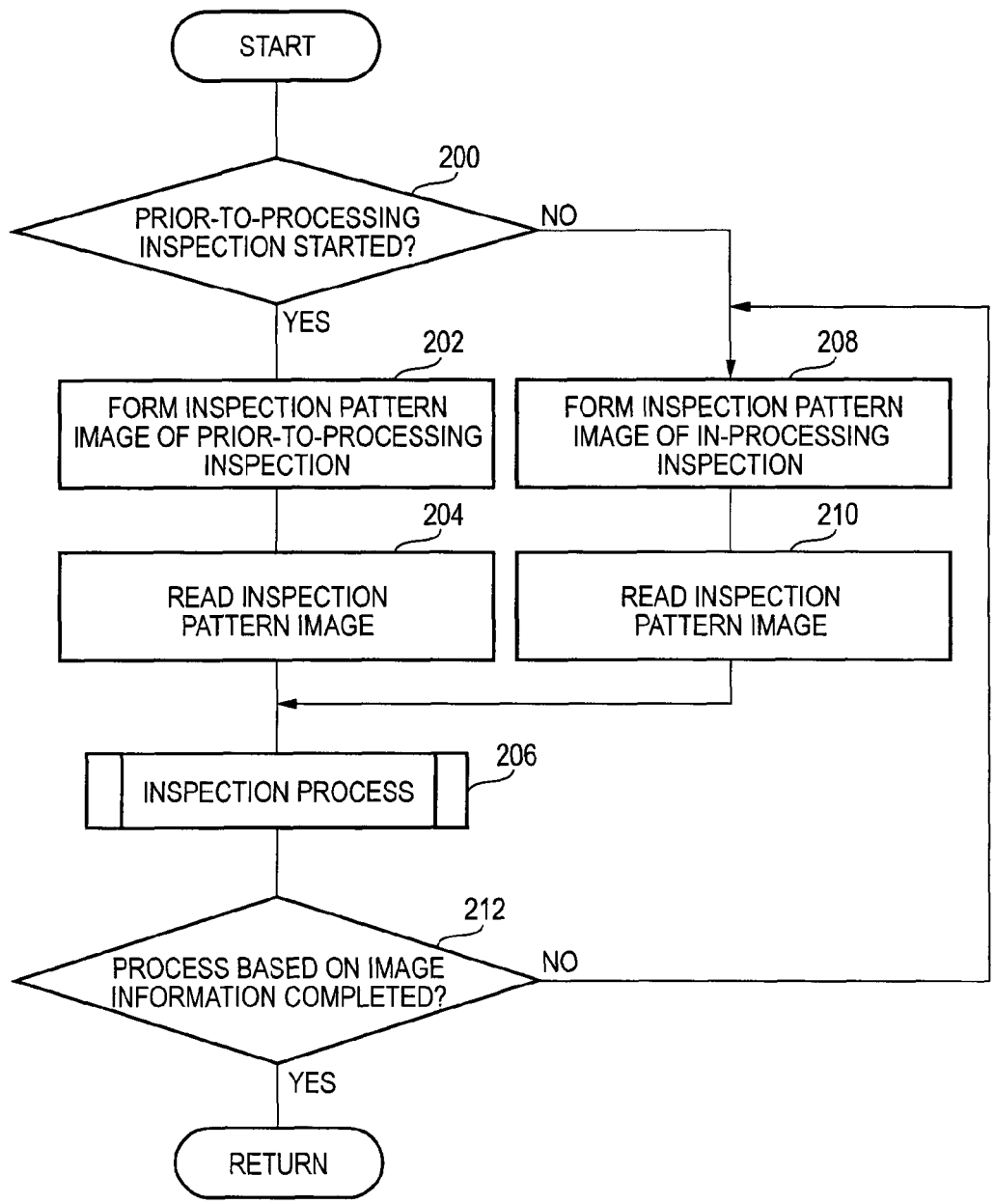
FIG. 7A is a flow chart schematically illustrating an image forming process.

FIG. 7A illustrates a flow of a nozzle inspecting process using the inspection pattern images 80 and 82.

In this flow chart, for example, if image information is input from the terminal device 64, the image information is executed by the computer 62 installed in the image forming apparatus 10. At the initial step 200, it is determined whether to start a prior-to-processing inspection. If it is before an image forming process is started on the successive recording papers W based on the image information, it is determined as a timing for performing a prior-to-processing inspection. Therefore, an affirmative determination is made at step 200 and the process proceeds to step 202. At step 202, the inspection pattern image 82 for performing the prior-to-processing inspection is formed on the recording paper W. At next step 204, the recording paper W on which the inspection pattern image 82 is formed arrives at the image fixing unit 20, the inspection pattern image 82 is read out by the CCD sensor 72 in such a state that the recording paper W is kept wound around the fixing cylinder 36, and image data based on the inspection pattern image 82 is acquired. Thereafter, at step 206, the inspection process is executed.

When the image based on the image information is formed on the recording paper W, a negative affirmative is made at step 200 and the process proceeds to step 208. At step 208, the inspection pattern image 80 used in the in-processing inspection is formed on each recording paper W. As a result, in the image forming apparatus 10, inspection pattern images 80 of the respective C, M, Y, and K colors together with the image based on the image information are sequentially formed on the respective recording papers W.

At next step 210, if the recording paper W on which the inspection pattern image 80 is formed arrives at the image fixing unit 20 and is kept wound around the fixing cylinder 36, the inspection pattern image 80 formed on the recording paper W is read out by the CCD sensor 72, and image data according to the inspection pattern image 80 formed on the recording paper W is acquired. Thereafter, the process proceeds to step 206 to execute the inspection process. If the inspection process is completed, at step 212, it is determined whether the image formation on the recording paper W based on the image information is completed. If not completed, a negative determination is made at step 212 and the process proceeds to step 208. The process continues to form the inspection pattern image 80 on the recording paper W and read out the inspection pattern image 80 by the CCD sensor 72.

Figure 7B:
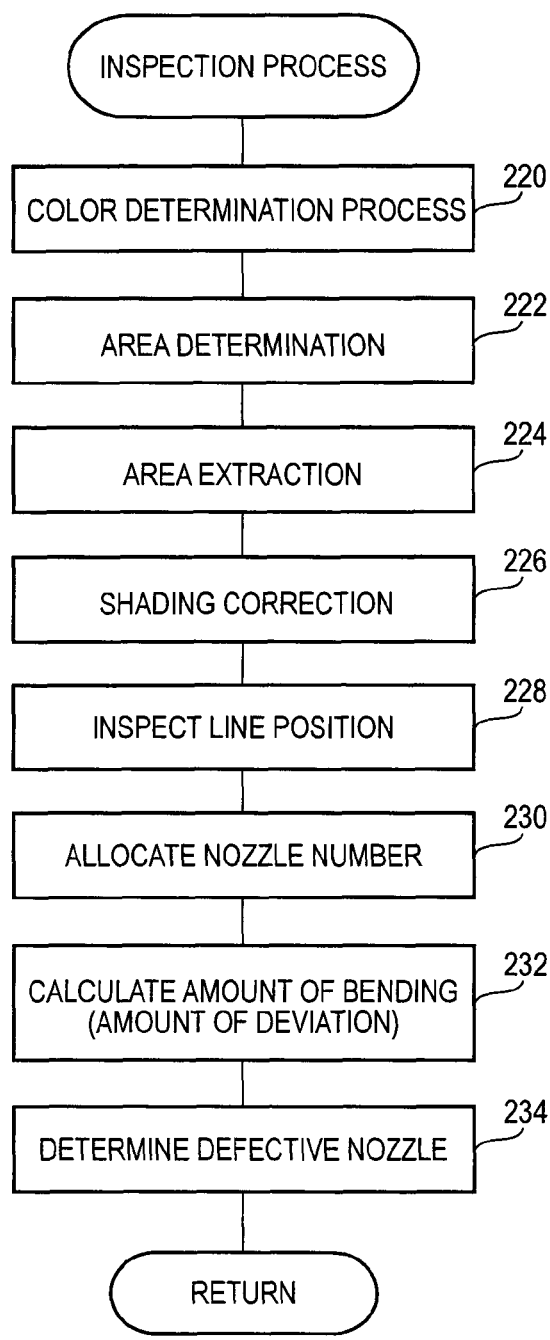
FIG. 7B is a flow chart schematically illustrating an inspecting process.

FIG. 7B schematically illustrates the nozzle inspecting process in the nozzle inspecting apparatus 68, which is corresponds to step 206 of FIG. 7A. The basic configurations of the nozzle inspecting process in the prior-to-processing inspection using the inspection pattern image 82 and the in-processing inspection using the inspection pattern image 80 are equal. Since the basic configuration of the inspection pattern images 80 and 82 is the pattern image 84, the pattern image 84 is set as the inspection target image, and the description will be made without discrimination between the prior-to-processing inspection and the in-processing inspection.

In this nozzle inspecting process, at step 220, color determination of the pattern image 84 (inspection pattern image 80 or inspection pattern image 82) is made based on the image data. The CCD sensor 72 reads out image data with respect to channels of the respective R, G, and B colors, acquires brightness data of the channels of the respective R, G, and B from the area corresponding to the pattern image 84, based on the acquired image data, and calculates an average value of the brightness values by extracting a predetermined number of data (for example, 20 pixel data) in higher order of concentration (in lower order of the brightness values) with respect to the channels of the respective colors. Thereafter, the average value of the brightness values of the respective colors is compared with a preset threshold value.

If the average value of the brightness values with respect to the entire channels of the R, G, and B is smaller than the threshold value, it is determined that the pattern image 84 is the K color, and it is set to use the image data of the G channel in the following nozzle inspection.

In this regard, if the brightness value of at least one color of R, G, and B exceeds the threshold value, a channel is determined from a minimum brightness value with respect to the brightness values of the respective R, G, and B channels. In this case, if the brightness value of the R channel is at the minimum, it is determined that the pattern image 84 is the C color and it is set to use the image data of the R channel. If the brightness value of the G channel is at the minimum, it is determined that the pattern image 84 is the M color and it is set to use the image data of the G channel. If the brightness value of the B channel is at the minimum, it is determined that the pattern image 84 is the Y color and it is set to use the image data of the B channel.

In a case where the image data is read out from the inspection pattern image 82, the pattern images 84 of the respective C, M, Y, and K colors are sequentially formed in the inspection pattern image 82. Therefore, the color determination may be skipped. In a case where the nozzle inspection is performed using the inspection pattern image 80, the color order of the pattern images 84 is fixed. Therefore, the color determination may be skipped and the color determination of the pattern images 84 may also be performed.

At next step 222, the area of the sub scanning direction which is received as the image data of the pattern images 84 is determined. The area determination is performed by acquiring the brightness distribution along the sub scanning direction from the image data of the channel set by performing the color determination, and specifying the range of the pattern images 84 along the sub scanning direction.

In a case where the inspection target is the inspection pattern image 82 in which the pattern images 90Y, 90M, 90C, and 90K of the respective C, M, Y, and K colors are formed, the areas of the respective colors, including the non-image area 92, are determined.

At next step 224, image data of the determined area is extracted. At this time, image data is extracted at each stage along the sub scanning direction of the pattern images 84. In the CCD sensor 72, in a case where a plurality of CCD sensors are arranged in the main scanning direction, image data is extracted from each CCD sensor.

In a case where the inspection target is the inspection pattern image 82 on which the prior-to-processing inspection is to be performed, image data of the non-image area 92 and the respective areas corresponding to the inspection pattern images 90 of the respective C, M, Y, and K colors are extracted. At this time, regarding the respective inspection pattern images 90 included in the inspection pattern image 82, image data are extracted with respect to each stage along the sub scanning direction. At this time, for example, each stage is divided into three blocks by three divisions with respect to each stage of the pattern image 84, and image data of three blocks of each stage are extracted.

At next step 226, shading correction is performed on the extracted image data. When the shading correction is performed on the image data of the inspection pattern image 82, shading coefficients for the respective RGB channels are created using the image data of the non-image area 92. Thereafter, the shading correction is performed on the image data of the respective R, G, and B channels by using the created shading coefficients.

In a case where the shading correction is performed on the image data of the inspection pattern image 80 formed with the image based on the image information of the recording paper W, the shading coefficient corresponding to the relevant channel is used from the shading coefficients for the respective R, G, and B channels created based on the image data of the non-image area 92 by the above-described prior-to-processing inspection.

Therefore, a profile in which the brightness values of the sub scanning direction are averaged is obtained at the blocks of the respective stages. At next step 228, the position of the main scanning direction is detected with respect to the line 88 of each stage of the pattern image 84.

Figure 8:
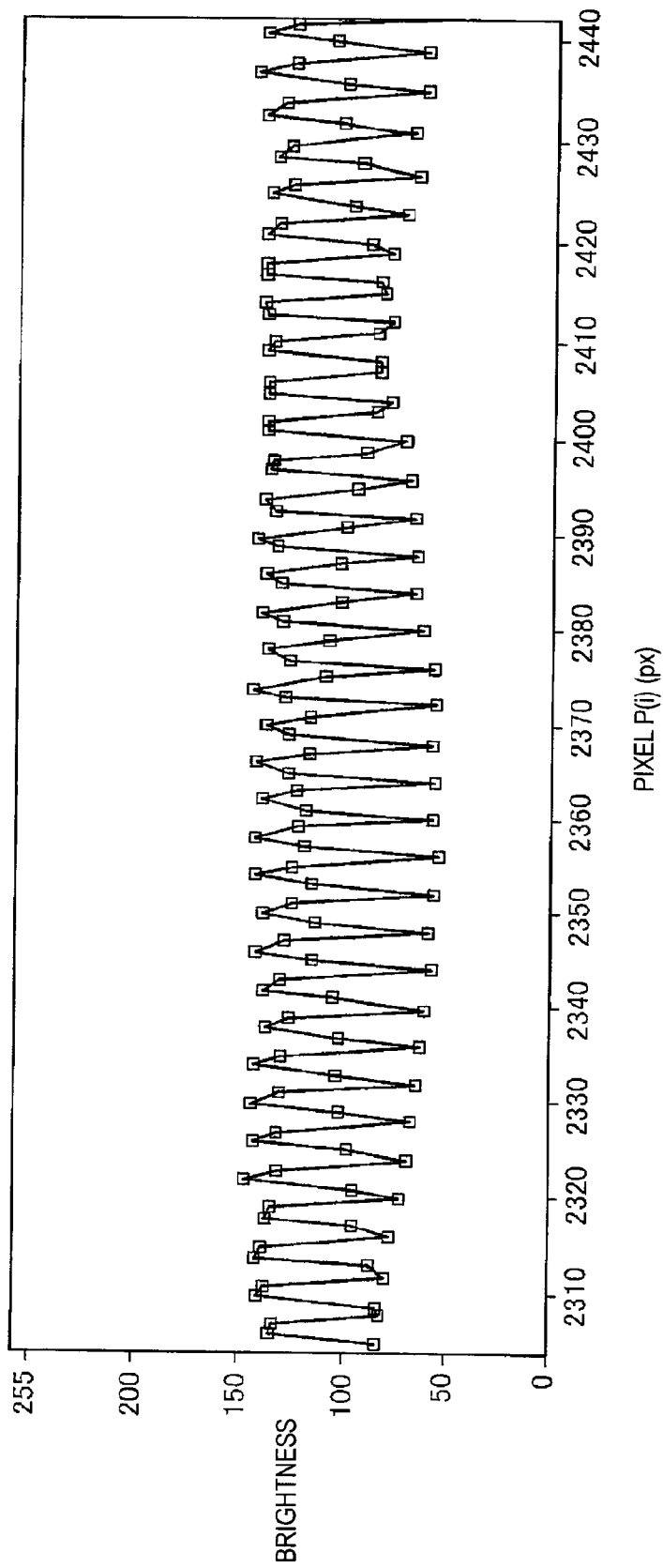
FIG. 8 is a diagram illustrating an example of a profile along a main scanning direction.

FIG. 8 illustrates an example of a profile. In this profile, the reading resolution Rs is set to 477 dpi, the inspection resolution Rp is set to 120 dpi, and the brightness value along the main scanning direction of 1 stage is obtained. Temporarily, with respect to the inspection resolution Rp of 120 dpi, if the reading resolution Rs is 480 dpi (four times the inspection resolution Rp), the lower end of the brightness value corresponding to the line 88 becomes an approximately straight line shape. In this regard, a phase difference for the CCDs 94 at each line 88 is changed by the deviation of the reading resolution Rs from the positive integer multiple of the inspection resolution Rp. Therefore, in the profile illustrated in FIG. 8, the brightness value detected by the CCDs 94 is changed in the main scanning direction. A horizontal axis represents an x coordinate p(i) that shows the position along the main scanning direction of the CCDs 94.

When the x coordinate of the line 88 is detected, a pixel p(i) of which the brightness value corresponding to the line 88 is lowest (a peak of the brightness value) is sequentially searched from the profile. The pixel p(i) represents the CCD 94, and the x coordinate along the main scanning direction is an x coordinate of the corresponding CCD 94.

Next, with respect to the pixel p(i), pixels p(i−1) and p(i+1) adjacent in the main scanning direction are read out, and a parabolic approximation is performed using the pixels p(i−1), p(i), and p(i+1). An x coordinate of the line 88 is set as an x coordinate of the peak. The x coordinate of the peak by the parabolic approximation may be expressed as Equation (1) from a difference f1 of brightness values of the pixel p(i) and the pixel p(i+1) and a difference f2 of brightness values of the pixel p(i) and the pixel p(i−1).

$$X_O = p(i) + \frac{f1 - f2}{2(f1 + f2)}$$
$$= p(i) + Xdiff$$

[Equation 1]

Figure 9:
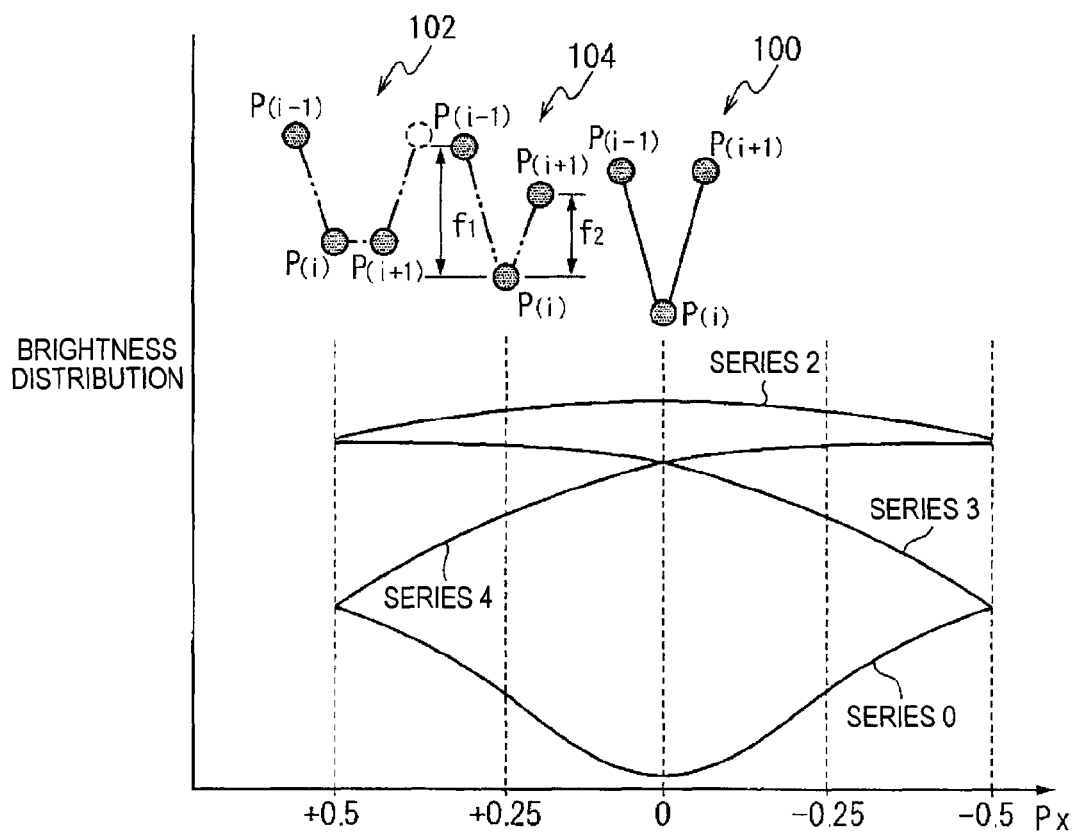
FIG. 9 is a diagram illustrating an example of a variation in brightness according to a phase difference and a concentration distribution of a CCD.

For example, in an arrangement 100 of the pixels p(i−1), p(i), and p(i+1) illustrated in FIG. 9, the brightness values of the pixels p(i−1) and p(i+1) are equal to each other. Therefore, the x coordinate of the pixel p(i) is determined as the x coordinate of the line 88. In an arrangement 102, the brightness value of the pixel p(i) having the peak brightness value is approximately equal to the brightness value of the pixel p(i+1) adjacent to the pixel p(i). The x coordinate of the line 88 is deviated from the pixel p(i) of the arrangement 102 by +½ pixel (+0.5 px).

In an arrangement 104, the arrangement of the pixels p(i−1), p(i), and p(i+1) is between the arrangement 100 and the arrangement 102. In this case, it is considered that the arrangement is deviated by +¼ pixel (+0.25 px).

However, if the x coordinate of the line 88 is calculated based on Equation (1) with respect to the arrangement 104, the amount of deviation from the pixel p(i) does not become ¼ pixel.

This results from the fact that the output of the CCD 94, which is the brightness value with respect to incident light, is nonlinear.

In the nozzle inspecting apparatus 68, a reference table of the correction table is stored in the ROM 62B. In the nozzle inspecting apparatus 68, the correction table is created using the reference table, and the correction table is updated whenever the nozzle inspection is performed. The updated correction table is stored in the NVM 62D.

Figure 10:
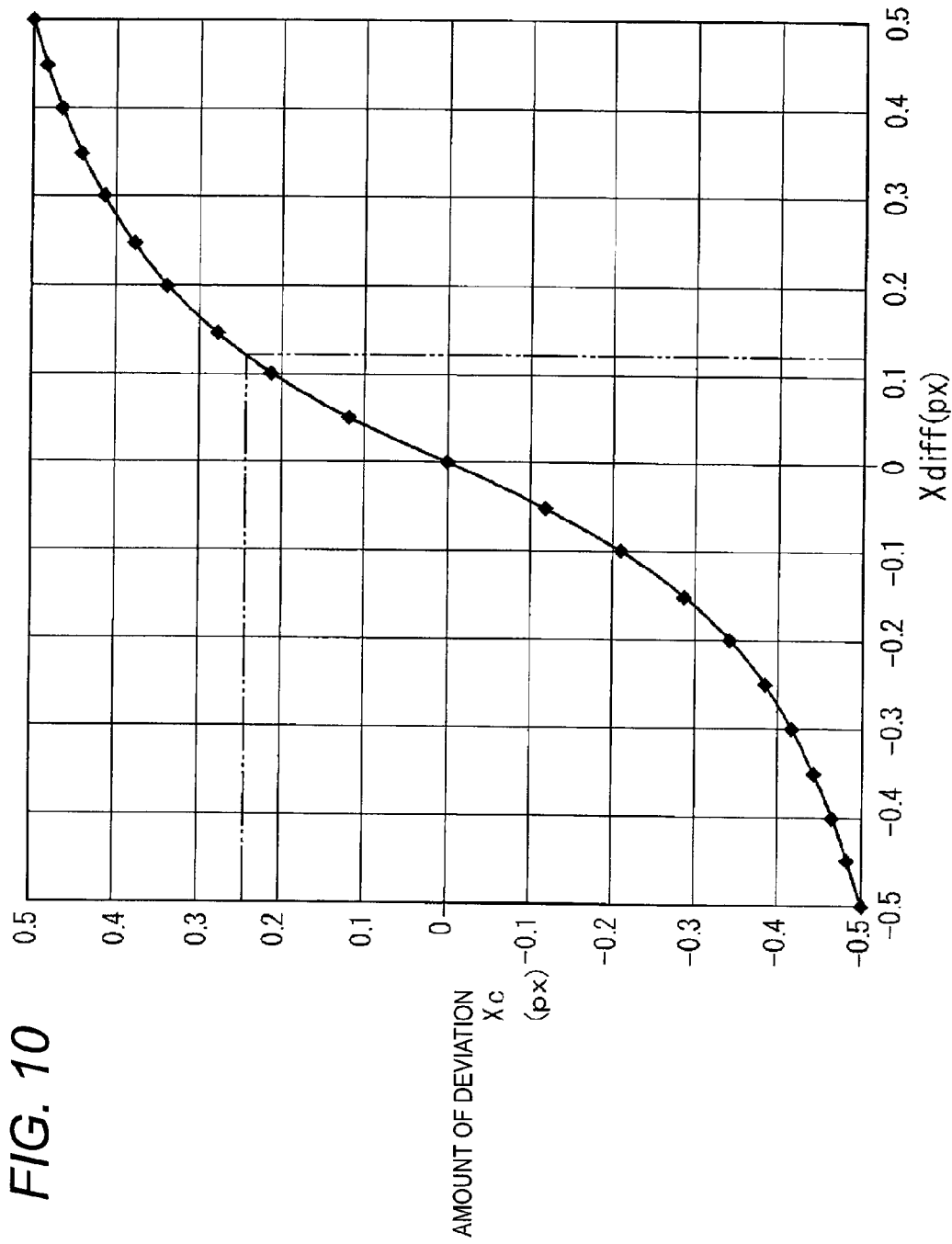
FIG. 10 is a diagram schematically illustrating of a correction table.

FIG. 10 illustrates an example of the correction table. In this correction table, a horizontal axis represents an amount of x-coordinate deviation Xdiff (px: pixel) obtained by a parabolic approximation, and a vertical axis represents an amount of actual x-coordinate deviation Xc(px). Using this correction table, the amount of actual x-coordinate deviation Xc may be obtained from the amount of deviation Xdiff obtained by the parabolic approximation, and the x coordinate XO of the line 88 is obtained from the amount of deviation Xc (XO=p(i)+Xc). For example, in the arrangement 104, if the amount of deviation Xdiff obtained by the parabolic approximation is 0.13 (px), the amount of actual x-coordinate deviation Xc is obtained as 0.25 (px) from the correction table.

Figure 11:
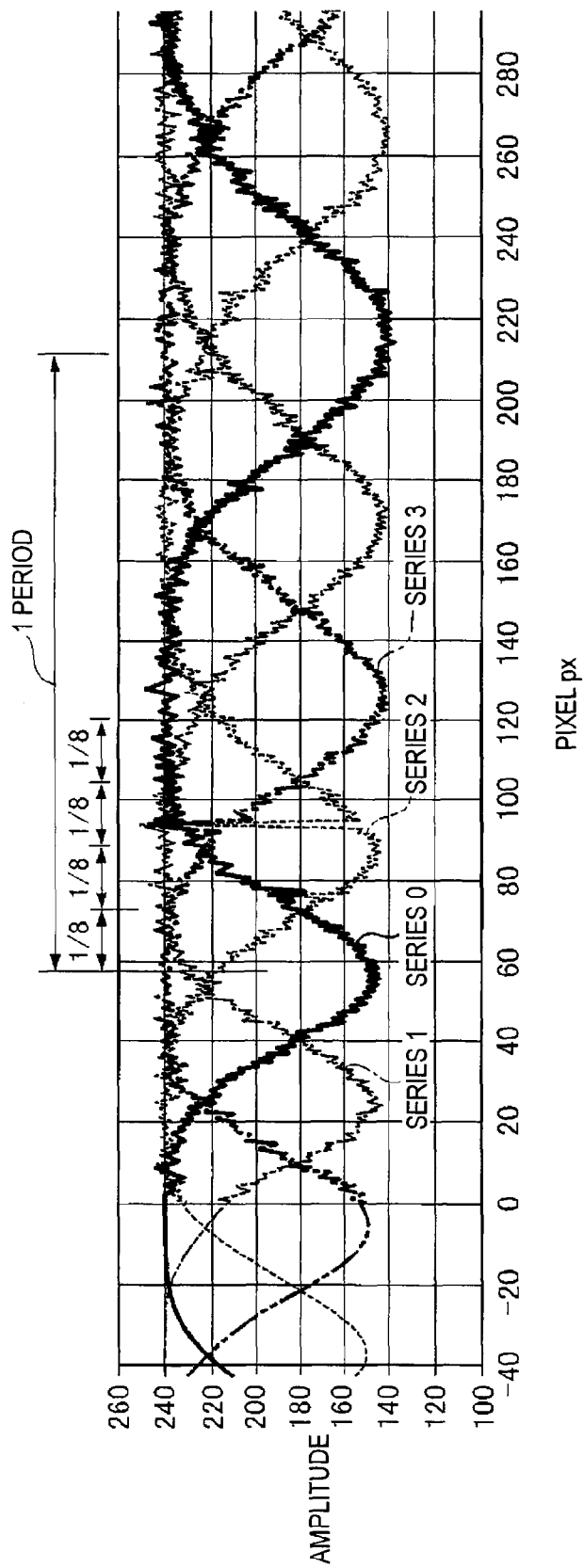
FIG. 11 is a diagram illustrating a variation in amplitude corresponding to a position of a main scanning direction of a CCD as a pixel caused by a phase difference.

In the nozzle inspecting apparatus 68, the reading resolution Rs with respect to the inspection resolution Rp is about four times. Data extracted by the area extraction are sequentially divided into a series 0, a series 1, a series 2, and a series 3. A change in amplitude with respect to the pixels of FIG. 11 (coordinates of the CCDs 64) is obtained by plotting the data divided into the series 0 to 3 on a series basis. Each of the four series, that is, the series 0 to 3, is changed periodically.

If 1 period from a valley to a next valley is divided by 8 with respect to the series 0, the first ⅛ corresponds to the series 0, the next ⅛ corresponds to an inversion of the series 2, the next ⅛ corresponds to an inversion of the series 3, and the next ⅛ corresponds to the series 1. This corresponds to the brightness distribution of the CCDs illustrated in FIG. 8.

A temporary correction table is created by dividing 1 period by 10. Since the correction table is obtained at each series with respect to the entire stages of the pattern image 84, the temporary correction table close to an actual value is created by taking an average. When taking an average, a sort may be performed to trim 20% of the upper and lower portion. Since the temporary correction table is the actual coordinate equal-division, the temporary correction table is converted into a parabolic-approximation coordinate equal-division table by a linear interpolation.

In the nozzle inspecting apparatus 68, when the image is formed on the recording paper W, the pattern image 80 is formed and the correction table is updated. Therefore, it is possible to have the correction tables according to a paper type such as a glossy paper, a matte paper, or a plain paper, and an ink type. In a case where the CCD sensor 72 is divided into a plurality of CCD sensors, it is possible to have the correction table at each CCD sensor.

As such, the nozzle inspecting apparatus 68 detects the position of the line 88 along the main scanning direction on the pattern image 84.

In the flow chart of FIG. 7B, when the main scanning direction of the lines 88 is detected, the process proceeds to step 230 to allocate the nozzle number of the corresponding nozzles 46 with respect to each line 88 whose main scanning direction is detected.

Figure 12:
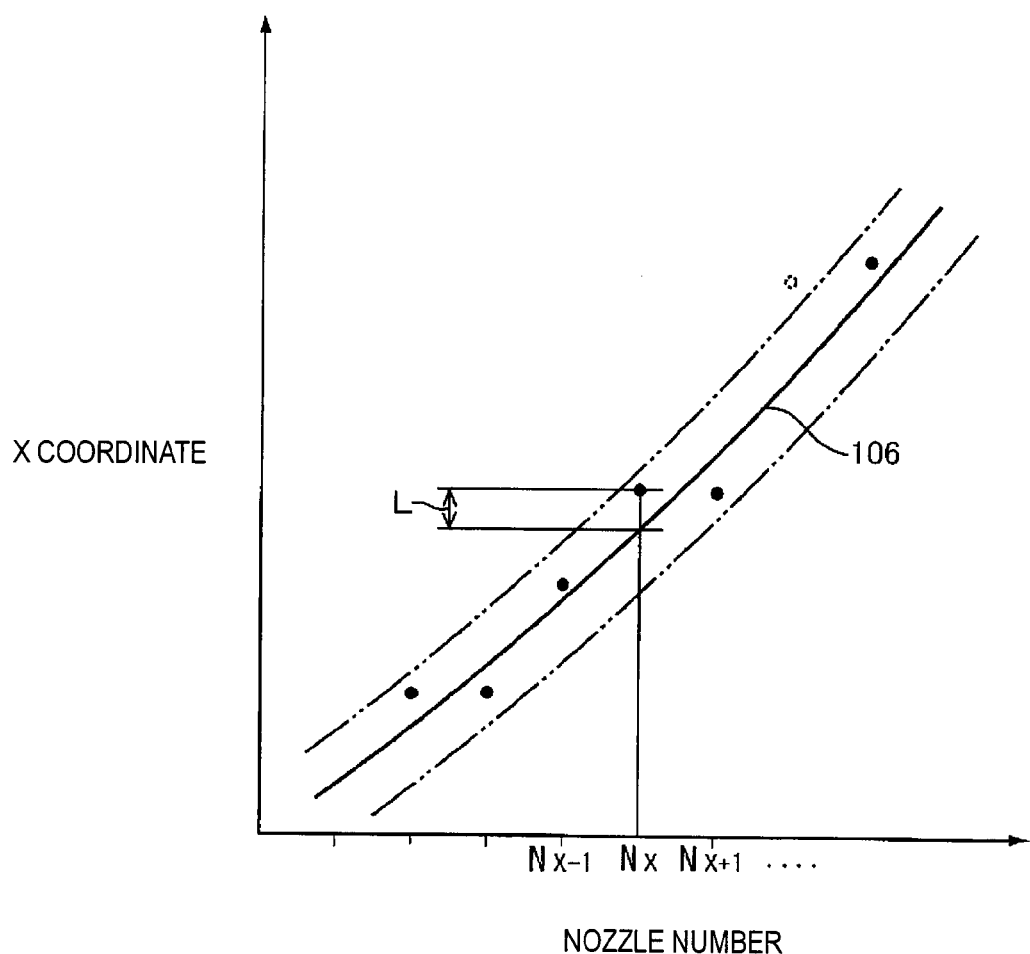
FIG. 12 is a diagram illustrating a position of a line with respect to a nozzle used in a secondary curve approximation.

Thereafter, at step 232, the amount of bending (amount of deviation) of each line 88 is calculated. In the calculation of the amount of bending, as illustrated in FIG. 12, a horizontal axis represents the nozzle number and a vertical axis represents the x coordinates in each nozzle 46.

Herein, with respect to the target nozzle 46 (nozzle number Nx), a plurality of previous and next nozzles 46 (for example, previous and next 12 nozzles 46) are compared, x coordinates are plotted with respect to the nozzles 46 to be compared, and an approximation is made by a secondary curve. A line 88 formed by the successive nozzles 46 is divided with respect to each stage in the pattern image 84, and is generally a straight line. However, it is approximated as a secondary curve so as to cancel the optical deformation of an image capturing system. With respect to the nozzle 46 of the end in the main scanning direction, the successive 25 nozzles 46 in the main scanning direction may be compared.

The approximated secondary curve is taken as a reference line 106. Among the nozzles 46 to be compared, if there is a nozzle 46 that is distant by more than a predetermined threshold value (represented by double-dashed lines in FIG. 12) with respect to the reference line 106, the corresponding nozzle 46 is excluded from the comparison target and a new reference line 106 is approximated. As for the predetermined threshold value, if distant by more than 6 μm (about 0.1126 px) in terms of the amount of deviation with respect to the reference line 106, it is excluded from the comparison target (represented by dashed lines in FIG. 12).

When the reference line 106 is drawn, the amount of deviation of the x coordinate of the target nozzle 46 with respect to the reference line 106 is calculated in terms of a distance L (μm). The amount of deviation of this nozzle 46 is calculated with respect to each nozzle 46. However, for example, if there is a nozzle 46 whose amount of deviation is greatly excluded in the calculation of an approximated secondary curve, the amount of deviation of the corresponding nozzle 46 may be excluded.

When the amount of deviation (the distance L from the reference line 106) of each nozzle 46 is calculated as above, the process proceeds to step 234 in the flow chart of FIG. 7B to determine whether each nozzle 46 is suitable by comparing the amount of deviation of each nozzle 46 with a predetermined threshold value (a determination parameter). If the bending in the ejection direction of ink droplets is small, and if the distance of the line 88 from the reference line 106 (the amount of deviation in the main scanning direction) is within a threshold value, the nozzle 46 forming the corresponding line 88 is determined to be suitable.

Herein, in the computer 62, with respect to the threshold value used to determine whether the nozzle 46 is suitable on the basis of the distance L from the reference line 106, the threshold value with respect to an inspection pattern image 84 of the prior-to-processing inspection and the threshold value with respect to an inspection pattern image 80 of the in-processing inspection are made small. The inspection (the determination as to whether the nozzle 46 is suitable) may be made by calculating the amount of bending of a plurality of samples with respect to each nozzle 46 and averaging the same.

If the recording head 44 includes a nozzle 46 having a predetermined amount of bending or more, the computer 62 of the image forming apparatus 10 stops using the corresponding nozzle 46, and performs data processing (supplementation processing) to supplement the pixels (dots) formed by the corresponding nozzle 46 with the ink droplets ejected from the surrounding nozzle 46.

In this manner, in the nozzle inspecting apparatus 68, the relationship between the reading resolution Rs and the inspection resolution Rp is $Rp \cdot ((m+1)/2) < Rs < Rp \cdot ((m+2)/2)$ (m is a positive integer), and the line 88 of the pattern image 84 is deviated with respect to the center of the CCD 94. This makes it easy to detect the position of the line 88 in the main scanning direction by the parabola approximation.

Although parabola approximation is used, as a mode of specifying the position of the center of gravity of the line 88, a mode that uses the concentration weight center, a mode that calculates the concentration weight center by linear interpolation, and a mode that calculates the concentration weight center by spline interpolation may be applied.

Although the relationship between the reading resolution Rs and the inspection resolution Rp is $Rp \cdot ((m+1)/2) < Rs < Rp \cdot ((m+2)/2)$ (m is a positive integer), it may be close such that the reading resolution Rs is not identical with respect to the positive integer multiple of the inspection resolution Rp. In this manner, the overlapping of the center of gravity of the line 88 in the main scanning direction with the center of the CCD 94 (no phase difference) is suppressed and the phase difference can be changed bit by bit, and thus a plurality of data with a phase difference is obtained with respect to the CCD 94. Accordingly, the position of the line 88 in the main scanning direction can be more exactly detected, and a suitable correction table used to detect the position of the line in the main scanning direction by parabola interpolation is obtained.

In the image forming apparatus 10, because an inspection pattern image 82 is formed to inspect the nozzle 46 before a successive image forming process on the recording paper W, a high-quality image can be formed on a recording paper W. In the image forming apparatus 10, because an inspection pattern image 82 is formed on each recording paper W to be formed with an image and the inspection pattern image 82 for the recording paper W is performed, high-quality image can be formed even when images are successively formed on the recording paper W.

Although the output of the CCD sensor 72 (CCD 94) varies according to the paper type of a recording paper W (for example, a plain paper, a glossy paper, and a matte paper) and the type of ink droplets, a correction table corresponding to each of the R, G, and B channels is updated by the prior-to-processing inspection and the in-processing inspection.

Therefore, high-quality images can be formed regardless of the type of a recording paper and the type of ink droplets.

In the nozzle inspecting apparatus 68, the reading resolution Rs is set on the basis of the inspection resolution Rp; however, the invention is not limited thereto. For example, the N for "1 on N off" may be set such that the inspection resolution Rp of the above relationship may be obtained with respect to the reading resolution Rs.

In the image forming apparatus 10, the inspection pattern image 80 (pattern image 84) formed on each recording paper W is formed at the front end of the recording paper W in the conveying direction (sub scanning direction), however, the invention is not limited thereto. For example, the inspection pattern image 80 may be formed at the rear end of the recording paper W in the conveying direction. The pattern image 84 may be divided into two sub pattern images in the sub scanning direction, wherein the one of the sub pattern images may be formed at the front end of the recording paper W in the conveying direction and the other of the sub pattern images may be formed at the rear end of the recording paper W in the conveying direction.

The inspection pattern image 84 may be formed by dividing the pattern image 84 of one color by 2 or more along the sub scanning direction, and separately forming the respective divided pattern images 84 on a plurality of sheets of recording papers W. In this manner, since the width along the conveying direction of the inspection pattern image 80 formed on one sheet of the recording paper W can be narrowed, the inspection pattern image 80 can be prevented from narrowing the image area 78.

Although it has been described above the nozzle inspecting program of the present embodiment is previously stored in the ROM 62B, the nozzle inspecting program of the present embodiment may be stored in a storage media, such as a CD-ROM, and a DVD-ROM. The nozzle inspecting program of the present embodiment may be provided through a network.

In the image forming apparatus 10, although the computer 62 reads out the inspection pattern image 80 formed with the image while forming the image on the recording paper W, executes the nozzle inspection process, and perform a new image forming process on the recording paper W, based on the process result, the invention is not limited thereto. An image processing apparatus (print management apparatus), which is a super ordinate to the computer 62, that outputs print data by performing the operation management of the image forming apparatus 10 and the image process with respect to the image information may be installed. In this case, the computer 62 reads out the image from the recording paper W, inspects the nozzles based on the reading result, and outputs the inspection result to the super ordinate print management apparatus. Therefore, the print management apparatus is configured to perform the correction process on the print data based on the nozzle inspection result.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image position inspecting apparatus, comprising:
a reading unit that includes light receiving elements arranged in a main scanning direction crossing a conveying direction of a recording media and that reads an inspection image formed on the recording media one pixel by one pixel at intervals of the same number of pixels along the main scanning direction;
a computer that generates a profile along a main scanning direction of the inspection image based on the inspection image read by the image reading unit; and
a computer that acquires a position of the center of gravity of the pixels of the inspection image with respect to the light receiving elements from the profile and that specifies a position of each of the pixels of the inspection image in the main scanning direction based on a phase difference, the phase difference being a deviation of the acquired position of the center of gravity of the pixels in the inspection image with respect to a light receiving center of the light receiving elements,
wherein, when a reading resolution of the image reading unit along the main scanning direction is Rs and a resolution of the inspection image along the main scanning direction is Rp, the reading resolution of the image reading unit and the resolution of the inspection image satisfy the following equation:

$$Rp \cdot ((m+1)/2) < Rs < Rp \cdot ((m+2)/2),$$

m is a positive integer.

2. The image position inspecting apparatus according to claim 1,
wherein the computer acquires the position of the center of gravity of the pixels by a parabolic approximation from brightness information of the light receiving elements of three points corresponding to the pixels of the profile.

3. The image position inspecting apparatus according to claim 2, further comprising:
a correction table that corrects the position of the center of gravity according to the phase difference of the pixels with respect to the light receiving elements.

4. The image position inspecting apparatus according to claim 3,
wherein the correction table is generated from the profile.

5. An image forming apparatus, comprising:
the image position inspecting apparatus according to claim 1; and
an image forming unit that includes ejection heads in which nozzles ejecting droplets are arranged along the main scanning direction and that forms an image based on image information by droplets ejected from the nozzles of the ejection heads according to the image information.

6. The image forming apparatus according to claim 5,
wherein the image position inspecting apparatus includes:
a computer that determines whether the pixel position is suitable based on a position of the main scanning direction of the pixels, the pixels formed on the recording media by the droplets ejected from the nozzles specified by the image position inspecting apparatus; and
a correcting unit that specifies the nozzle corresponding to the pixel which is determined as unsuitable by the determining unit and that corrects the image information so as to complement the pixel corresponding to the specified nozzle with droplets ejected from another nozzle which is adjacent to the specified nozzle.

7. An image position inspecting apparatus, comprising:
- a reading unit that includes light receiving elements arranged with a reading resolution Rs in a main scanning direction crossing a conveying direction of a recording media and that reads an inspection image formed on the recording media one pixel by one pixel at intervals of the same number of pixels along the main scanning direction, a resolution of the inspection image being Rp;
- a computer that generates a profile along a main scanning direction of the inspection image based on the inspection image read by the image reading unit; and
- a computer that acquires a position of the center of gravity of the pixels of the inspection image with respect to the light receiving elements from the profile and that specifies a position of each of the pixels of the inspection image in the main scanning direction based on a phase difference, the phase difference being a deviation of the acquired position of the center of gravity of the pixels in the inspection image with respect to a light receiving center of the light receiving elements,
- wherein at least three pixels of the pixels neighboring each other in the main scan direction are opposed to at least three elements of the light receiving elements each of which comprises a sensing area having a predetermined width in the main scan direction, and
- the three pixels are opposed to the three elements at different positions within the predetermined widths of the sensing areas, respectively.

* * * * *